United States Patent [19]
Zimmermann et al.

[11] 3,855,861
[45] Dec. 24, 1974

[54] METHOD FOR MEASURING LIQUID LEVEL BY ELECTRICAL CONDUCTIVITY

[75] Inventors: Heino Zimmermann; Heinrich Hansemann, both of Bremen, Germany

[73] Assignee: Gustav F. Gerdts KG, Bremen, Germany

[22] Filed: Mar. 28, 1973

[21] Appl. No.: 345,815

[30] Foreign Application Priority Data
Apr. 1, 1972  Germany............................ 2215950

[52] U.S. Cl............................................. 73/304 R
[51] Int. Cl............................................. G01f 23/24
[58] Field of Search....................................... 73/304

[56] References Cited
UNITED STATES PATENTS
3,678,749   7/1972   Harper............................. 73/304 R
FOREIGN PATENTS OR APPLICATIONS
842,554   6/1952   Germany........................... 73/304 R Primary Examiner—S. Clement Swisher
Attorney, Agent, or Firm—Allison C. Collard

[57] ABSTRACT

A method for measuring a liquid according to the conductivity principle employing three electrodes, having one electrode constantly submerged in the electrically conductive liquid; a second electrode serving as a measuring electrode and submerged partially in the liquid level; a third electrode serving as the control electrode for the first and second electrodes, wherein an electric resistance exists between the first and second electrode depending on the submerged depth and the specific conductivity of the liquid so that both resistance values result in partial voltage drops which are compared and indicated with each other by compensating the conductivity fluxuations, comprises the steps of measuring separately both partial voltage drops of said first and second electrodes; applying the partial voltage drop of the first electrode to a saw-tooth generator so that the amplitude of the saw-tooth voltage output is equal to the voltage drop of said first electrode in a given time span, and applying the saw-tooth output voltage and the partial voltage drop of the second electrode to a comparator so that at the output of the comparator, a rectangular pulse signal is obtained having its ratio of pulse width to pulse period equaling the submerged depth.

3 Claims, 2 Drawing Figures

METHOD FOR MEASURING LIQUID LEVEL BY ELECTRICAL CONDUCTIVITY

This invention relates to measuring a liquid level in accordance with the conductivity principle, and employs three electrodes. One electrode is constantly submerged in the electrically conductive liquid. The second electrode serves as a measuring electrode and is partially submerged in the liquid level. The third electrode serves as a control electrode for the two previously mentioned electrodes.

The electric resistance existing between the first and the third electrode depends on the submerged depth and the specific conductivity of the liquid. Consequently both resistance values result in partial voltage drops that are compared and indicated with each other by compensating the conductivity fluctuations.

In prior methods of liquid level measurement, both resistors are switched in series and form a branch for a bridge switch. The other branch of the bridge is formed by two other equivalent resistors. Unbalancing of the bridge due to different submerging depths is indicated by measuring the bridge's diagonal voltage.

This method is disclosed in German Pat. No. 842,554. However, it has its drawbacks because the indicated values are not always linear with respect to the submerged depth. Furthermore, the bridge branch may have such a low resistance in large conductivity fluctuations that the internal resistance of the voltage source inevitably results in erronous reading of bridge diagonal voltage.

German laid open pat. No. 2,107,183 shows that linear readings can be obtained by a certain geometric configuration of electrode faces. However, this remedy does not work in all situations.

According to the inventive method partial voltages $U_1$ of a first electrode totally submerged in a conducting liquid, and $U_2$ of a second electrode partially submerged in the conducting liquid are measured separately. The partial voltage $U_1$ controls a saw tooth generator so that the amplitude of the saw tooth voltage is equal to $U_1$ in a time span T. Saw tooth voltage $U_s$ is compared with partial voltage $U_2$ in a comparator, so that a rectangular voltage is obtained at the output of the comparator, the ratio of the pulse width to the pulse period being equal to the submerged depth.

To achieve digital measurements, the pulse width to period of the rectangular voltage can be counted. The rectangular voltage can be modulated so as to be used for a analog or digital measuring value.

It is therefore an object according to the present invention to eliminate the disadvantages of prior methods. In particular, it is an object of the present invention to suggest a method which achieves linearization and operates in all situations.

Other objects and features of the present invention will become apparent from the following detailed description considered in connection with the accompanying drawings which disclose the embodiment of the present invention. It should be understood, however, that the drawings are designed for the purpose of illustration only and not as a definition of the limits of the invention to which reference should be made to the appended claims.

In the drawings, wherein similar reference characters denote similar elements:

Figure 1:
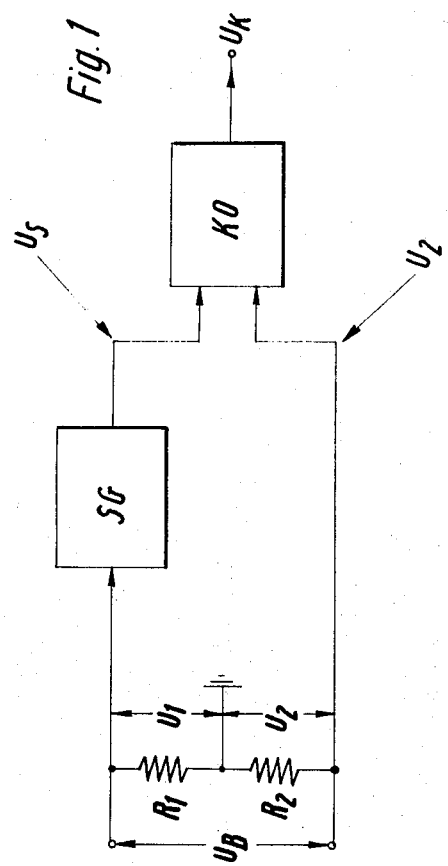
FIG. 1 is a block diagram of the present invention.
Figure 2:
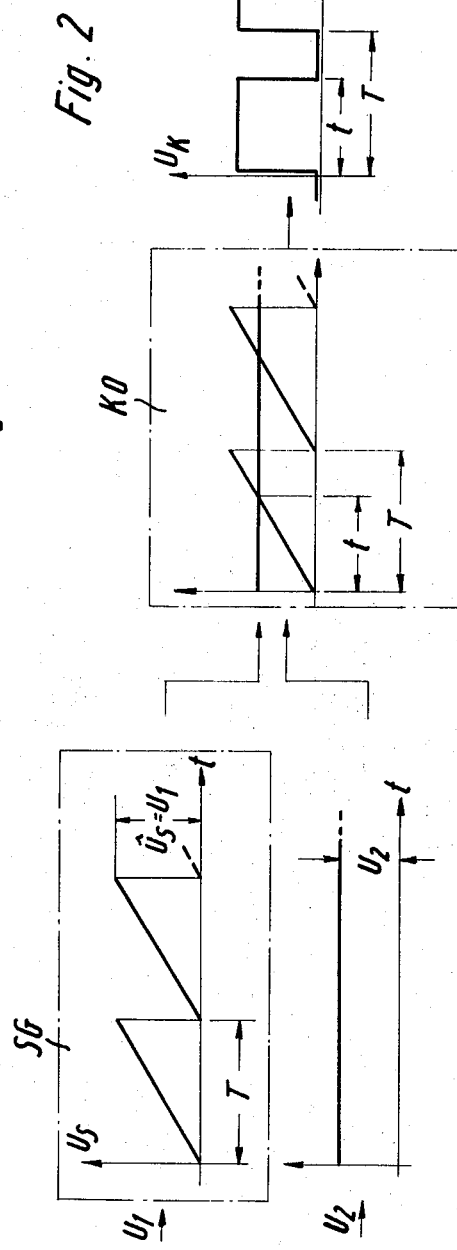
FIG. 2 shows the output of the representative elements of FIG. 1.

Referring now to FIG. 1 and the graphic showing of the formula for the method in FIG. 2, the separately measured partial voltage results in $$U_1 = U_B \cdot 1/1 + a$$

and $$U_2 = U_B \cdot a/1 + a$$

In this formula $a$ is the value for the submerged depth.

$U_1$ is the voltage drop existing across resistor $R_1$ of the voltage divider network comprising $R_1$ and $R_2$, and is applied to the saw-tooth generator SG. In generator SG, a saw-tooth output voltage $U_s$ of a period T gives rise to an instantaneous value that is:

$$U_s = U_1 \cdot t/I = U_B \cdot 1/1 + a \cdot t/I$$

The voltage drop $U_2$ existing across the other resistor $R_2$ of the voltage divided network comprising $R_1$ and $R_2$ is applied to comparator KO. Thus, the inputs applied to comparator KO comprise voltages $U_s$ and $U_2$. The comparator always changes the sign of its output voltage when the difference $U_s - U_2$ is nearly zero. Now, $$U_B \cdot 1/1 + a \cdot t/T = U_B \cdot a/1 + a$$

so that an insertion ratio $$t/T = a$$

is obtained which is a linear measurement of the submerged depth a. It is to be understood that the disclosed method may also be used for capacitive working type measuring probes.

While only a single method of the present invention has been shown and disclosed, it is understood that other variations of the methods are within the scope of the invention.

What is claimed is:

1. A method for measuring a liquid level according to the conductivity principle employing three electrodes, having a first electrode constantly submerged in the electrically conductive liquid; a second electrode serving as a measuring electrode and submerged partially in the liquid level; a third electrode serving as the control electrode for said first and second electrodes, wherein an electrical resistance exists between the second electrode and the third control electrode which is determined by the submerged depth and the specific conductivity of the liquid, and another electric resistance exists between the constantly submerging first electrode and the third control electrode depending on the specific conductivity of the liquid, and that both resistance values result in partial voltage drops which are compared and indicated with each other by compensating the conductivity fluctuations, comprising the steps of:

measuring separately both partial voltage drops of said first and second electrodes;

applying the (partial) voltage drop of the first electrode to a saw-tooth generator so that the amplitude of the saw-tooth electrode to a saw-tooth voltage output is equal to the voltage drop of said first electrode with respect to the third electrode in a given time span; and applying the saw-tooth output voltage and the partial voltage drop of the second electrode with respect to the third electrode to a comparator, so that at the output of the comparator, a rectangular pulse signal is obtained having its ratio of pulse width to pulse period equalling the submerged depth.

2. The method according to claim 1 further comprising the step of digitally measuring the value of the width to the period of the rectangular voltage output of the comparator to produce a digital count.

3. The method according to claim 1 further comprising the step of modulating the rectangular voltage output of the comparator and obtaining an analog measuring value.

* * * * *